UNITED STATES PATENT OFFICE.

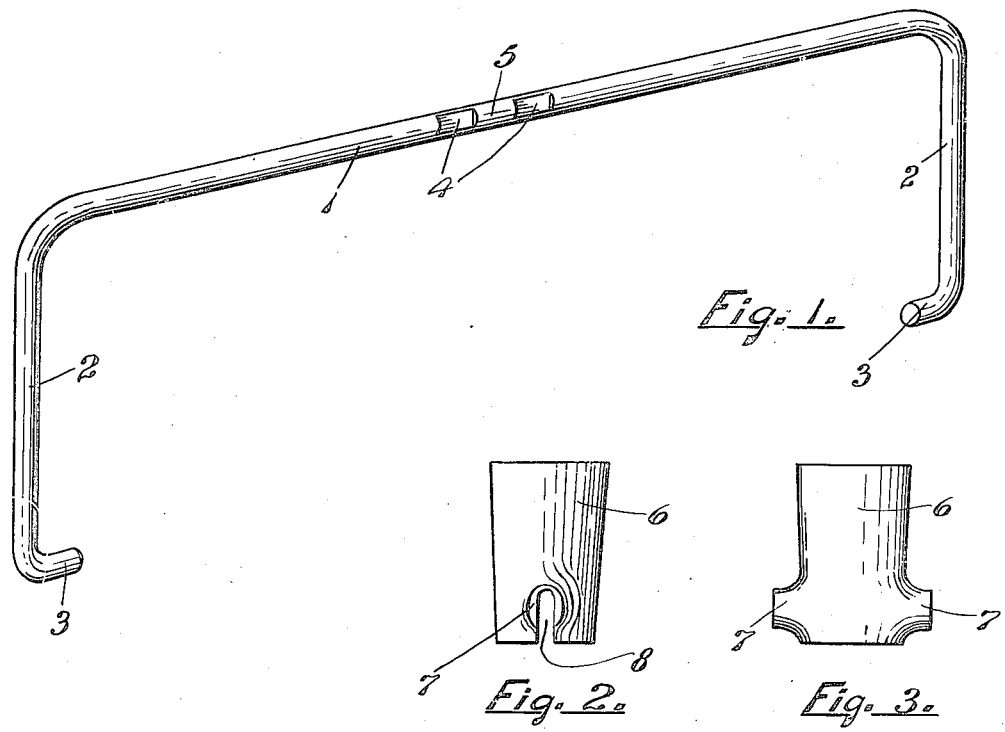
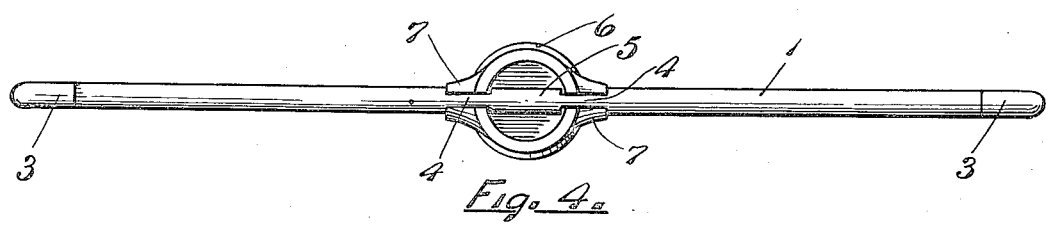
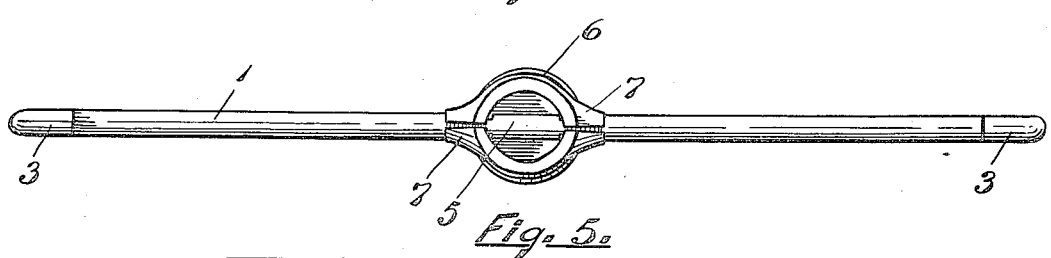
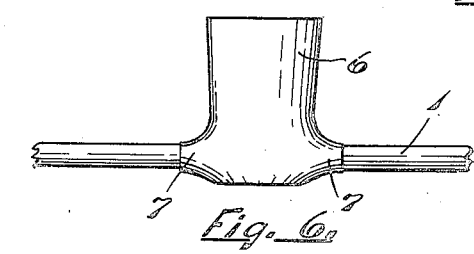

JOHN W. SHANAHAN AND BERNARD JOHN BOUWMEESTER, OF GRAND RAPIDS, MICHIGAN, ASSIGNORS TO BISSELL CARPET SWEEPER COMPANY, OF GRAND RAPIDS, MICHIGAN, A CORPORATION OF MICHIGAN.

BAIL FOR CARPET-SWEEPERS AND THE LIKE.

1,288,706.  Specification of Letters Patent.  Patented Dec. 24, 1918.

Application filed February 15, 1917. Serial No. 148,772.

*To all whom it may concern:*

Be it known that we, JOHN W. SHANAHAN and BERNARD JOHN BOUWMEESTER, citizens of the United States of America, residing at Grand Rapids, in the county of Kent and State of Michigan, have invented certain new and useful Improvements in Bails for Carpet-Sweepers and the like; and we do hereby declare the following to be a full, clear, and exact description of the invention, such as will enable others skilled in the art to which it appertains to make and use the same.

This invention relates to a combined bail and handle socket for carpet sweepers and like devices and the method of producing the same. The bail is adapted for attachment to the body of a sweeper while the socket is for the reception of the lower end of a handle which the operator grasps in working the same. It is the object and purpose of the present invention to produce a bail and socket of this character through a novel and effective method by which a connection of a separate bail and socket is made such that the same can be manufactured at a minimum cost and yet be durable and efficient and thoroughly capable of serving all of the purpose that any combined bail and socket for like use may serve.

For an understanding of the invention reference may be had to the accompanying drawing in which;

Figure 1 is a perspective view of the bail before the socket is applied thereto.

Figs. 2 and 3 are elevations from different sides of the socket member as formed for application to the bail.

Fig. 4 is an under plan view of the bail and socket member placed together but before the permanent connection thereof.

Fig. 5 is a view similar to Fig. 4 after the permanent connection of the socket and bail has been made, and Fig. 6 is a fragmentary side elevation of the permanently connected bail and socket.

Like reference characters refer to like parts throughout the several views of the drawing.

The bail is formed preferably from a drawn metal rod and includes an upper horizontal section 1 with ends 2 bent substantially at right angles thereto and turned back for a short distance as indicated at 3 parallel to the main section 1 of the bail. The ends 3 are adopted to seat in suitable openings in either side of a sweeper casing or housing. Substantially at its center the upper section 1 of the bail is flattened, as indicated at 4, in two places on opposite sides of the bail there being left between the flattened portions a portion 5 of the same cross section as the remainder of the bail.

The socket member 6, preferably, is a casting of malleable iron and is interiorly screw threaded to receive the lower end of the sweeper handle. From opposite sides of the socket member lugs 7 project, each being slotted for a distance in the underside as shown at 8. The width of the slot is slightly greater than the thickness of the flattened portions 4 of the bail and its depth is considerably greater than the width of said flattened portions as will be evident.

The socket member and bail thus formed may be placed the one over the other, the flattened portions 4 of the bail readily entering the slots 8 in lugs 7 as shown in Fig. 4. When so positioned the lower end of the socket member is placed in a suitably formed die on the bed of a punch press and at one stroke of the ram of said press, its lower end carrying a suitably formed punch, the lower parts of the socket member are forced toward each other and pressed into positions indicated in Fig. 5 with the lower portions of slots 8 substantially closed, permanently attaching the socket member to the bail.

Heretofore it has been a common practice to cast the bail and socket member in one piece making the same from malleable iron which in finishing has to be ground and polished at heavy expense. A combined bail and socket formed by our method requires only that the socket member 6 be ground as the rod from which the bail is formed is smoothly drawn and may be bent into shape in perfect condition for polishing and finishing. By reason of the flattening of the bail on opposite sides and attachment of the socket member in the manner described it is impossible for said bail and socket member to move with respect to each other. And they are for all practical purposes in effect the same as though cast integral one with the other. The method of attachment of the socket to the bail is very simple and may be very easily effected and the reduction in cost is such that practically the complete socket and bail made according to our invention can be produced for the expense of the grinding operation alone in the previous bails and sockets.

We claim:—

1. The herein described method of attaching a socket member to a bail which consists in providing a bail with oppositely flattened sides, and a socket member slotted for a distance at one end, entering the flattened portion of the bail into the slots in the socket member and then clenching the socket member on the bail by pressure to close the slots.

2. The herein described method of attaching a socket member to a bail which consists in providing a bail of circular cross-section flattened a short distance on opposite sides, and a socket member slotted at one end, then entering the flattened portion of the bail into said slots in the socket member, and then applying sufficient force to the socket member to clench it on the bail, substantially closing the slots at their outer ends.

3. The herein described method of attaching a socket member to a bail which consists in providing a bail and a socket member having oppositely extending lugs, flattening the bail on opposite sides at two places spaced apart a distance substantially equal to the distance between the inner sides of the socket member, and each of a length substantially equal to the thickness of one side of the socket member plus the length of a lug, then slotting the socket member at one end to a point nearly through the lugs, entering the flattened portions of the bail in said slots, and then clenching the socket member and lugs on the bail by pressure tending to close the open ends of the slots, substantially as described.

In testimony whereof we affix our signatures.

JOHN W. SHANAHAN.
BERNARD JOHN BOUWMEESTER.